Figures 1, 2:
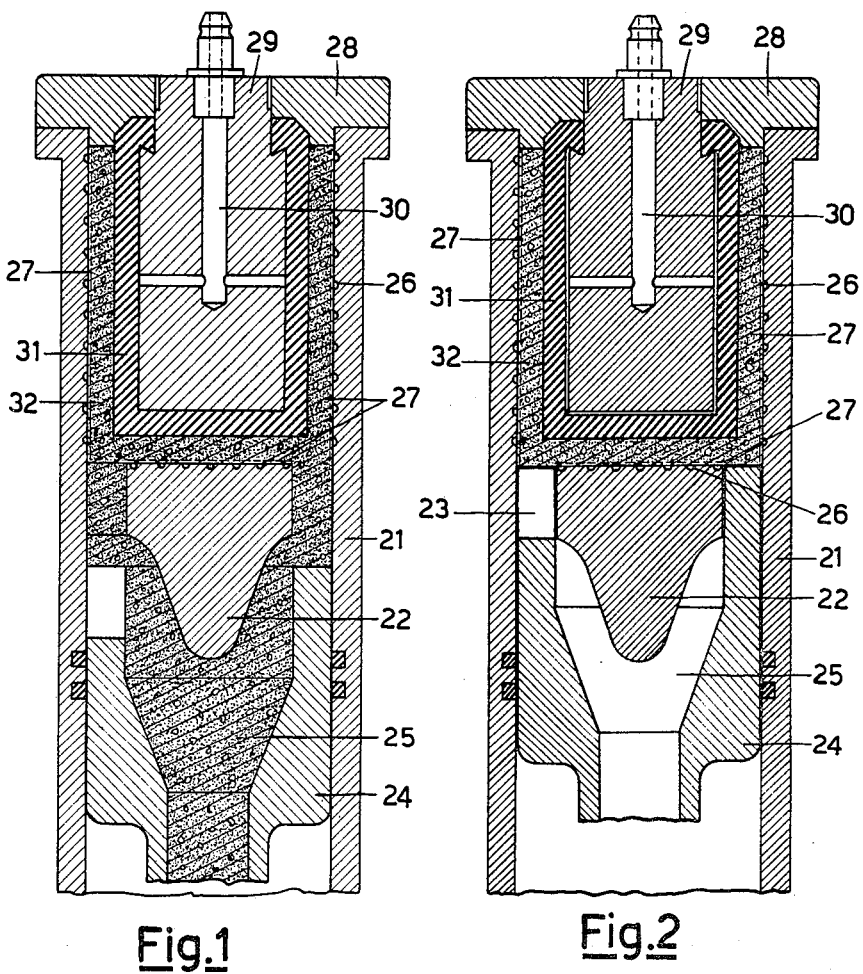

Nov. 16, 1965   G. GREMIGNI   3,218,377
METHOD AND MEANS FOR MOLDING AN AQUEOUS FIBROUS MIXTURE
Filed May 23, 1962

INVENTOR.
GUISEPPE GREMIGNI
BY
ATTORNEY

3,218,377
METHOD AND MEANS FOR MOLDING AN AQUEOUS FIBROUS MIXTURE

Giuseppe Gremigni, Milan, Italy, assignor to Societe Anonyme Francaise Eternit, Paris, France, a company of France
Filed May 23, 1962, Ser. No. 197,120
Claims priority, application France, May 26, 1961, 863,057
6 Claims. (Cl. 264—86)

The presen invention has for its object the molding of articles through the injection of a moist mixture having as a base a hydraulic binder, such as cement, asbestos, cellulose or the like.

The molding of articles through injection of such a mixture requires that the latter may be very liquid, so as to flow readily inside the injection channels and the different hollow sections of the mold. The resistance of the molded article requires, in contradistinction, that the amount of water in the mixture may be as reduced as possible.

In order to conciliate these two opposite requirements, it has already been proposed to introduce a very liquid mixture into a mold containing an inflatable core made of an elastically yielding material, of which the expansion reduces the volume of the hollow parts of the mold and expels the excess water through the ports provided in the rigid wall of said mold. Through this method, the modifications in volume corresponding to the volume of the water to be expelled, are obtained entirely through the deformation of a wall which is yielding and thereby assumes a shape which cannot be accurately controlled.

The necessary decrease of the volume of the mould hollow could be obtained by displacing a rigid part movable within a cylindrical part, or a prismatic part, of this hollow space; by so doing, the volume and the final shape of the produced piece would be exactly determined, but the final pressure would be, in general, uneven in any points of the relatively dry mass, especially if the attainment of high pressures is desired.

According to the present invention, at least a partial reduction of the volume of the hollow portion of the mold is obtained by the controlled shifting of a rigid wall adapted to move axially inside a cylindrical section forming part of the hollow portion of the mold. There is thus obtained an accurate shape and volume for the inner chamber of the mold inside which the mixture is carried in at least partly dehydrated and compressed condition; this being done, a deformable wall, for example, an inflatable core is displaced, which latter is not intended to serve for the expulsion of all the water contained in the mixture, but only of a more or less important fraction thereof, that is to say, by acting upon a mixture which is relatively devoid of water and already has a certain consistency.

A preferred embodiment of the present invention consists in that the rigid shiftable wall may also serve as a closure for the injection channel during the first stage of its compression stroke.

It has been illustrated, by way of example, in the accompanying drawings, a preferred embodiment of the present invention.

In said drawings:

FIGS. 1 and 2 are sectional views of an apparatus for the execution of hollow articles in two different positions thereof.

The apparatus illustrated in FIGS. 1 and 2 serves for executing hollow articles, chiefly of a reduced wall thickness. It includes a tubular member 21 inside which is housed a core 22 secured to said tubular section 21 by connecting means 23. A piston 24 provided with a central recess 25 adapted to engage the core 22, is adapted to slide inside the tubular member 21. When the piston 24 is in the position illustrated in FIG. 2, its terminal section is accurately seated in a sector of the annular gap extending between the tubular member 21 and the core 22 which are separated from each other by the connecting means 23; when, in contradistinction, the piston 24 is in its recessed position illustrated in FIG. 1, there is a free communication provided between its central recess 25 and the chamber formed by the tubular member 21 and surrounding the core 22.

The inner wall of said tubular member and also the outer terminal wall of the core 22 are provided with a number of small channels 26 and are covered by a metal gauze or a perforated metal sheet 27 forming the wall of the actual mold.

The front end of the tubular member 21 is closed by a cover 28 to which is secured a rigid core 29 through which passes a channel 30, the inwardly facing surface of said core being covered by a sheath 31 of a waterproof elastic material such as rubber, spaced by a predetermined distance from the tubular member 21 and from the core 22, so as to define a chamber 32 corresponding substantially to the shape of the article to be molded.

The central recess 25 in the piston 24 communicates with a container for the moist mixture, which container is not illustrated, since it may be positioned at any point and be connected with the piston 24, for instance through a yielding pipe.

When the parts of the piston are in the position illustrated in FIG. 1, the mixture fills entirely the space enclosing the core 22 and the sheath 31 of the core 22. When the piston is allowed to progress, its front edge closes first the connection between its central recess 25 and the chamber 32 and it compresses then inside the latter the fraction of the mixture contained therein, whereas a corresponding volume of water is expelled through the sieve constituted by the gauze or the perforated metal sheet 27 and the small channels 26 connected with the outer atmosphere.

The mixture becomes thus thicker and it is then possible to obtain a further compression of the mixture by introducing a compressed fluid into the channel 30, so as to produce an expansion of the elastic sheath 31.

I claim:

1. A process for moulding hollow articles from an easily flowable mixture of water, fibres and hydraulic binder comprising
    (A) injecting the mixture into a mould cavity defined between a rigid wall surface which is at least partly water-pervious and a resiliently yieldable wall surface,
    (B) closing said mould cavity and simultaneously displacing a portion of said rigid wall surface into said mould cavity while rigidly backing up the resiliently yieldable wall surface so as to reduce the volume of the mould cavity substantially to that of the desired hollow article, thereby expressing a substantial portion of the water from said mixture in the mould cavity, and
    (C) applying fluid under pressure to said resiliently yieldable wall surface to urge the latter toward said rigid wall surface, thereby completing the expressing of water from the mixture and the compression of the latter in said mould cavity.

2. Apparatus for moulding hollow articles from an easily flowable mixture of water, fibres and hydraulic binder, said apparatus comprising
    (A) a rigid, at least partly water-pervious wall structure, a resiliently yieldable wall structure spaced from said rigid wall structure to define a mould cavity therebetween and a rigid support structure engageable with substantially the entire surface of said resiliently yieldable wall structure facing away from said rigid wall structure, (a) means defining an opening for the injection into said mould cavity of the easily flowable mixture, (b) said rigid wall structure having a movable portion displaceable into said mould cavity for reducing the volume thereof after the injection of the mixture into said mould cavity, thereby expressing a substantial portion of the water from the mixture while the shape of said resiliently yieldable wall structure is positively determined by said rigid support structure; and (B) means for applying fluid under pressure between said rigid support structure and said resiliently yieldable wall structure to urge the latter toward said rigid wall structure, thereby completing the expressing of water from the mixture and the uniform compression of the latter in said mould cavity.

3. Apparatus for moulding hollow articles from an easily flowable mixture of water, fibres and hydraulic binder, said apparatus comprising (A) a mould structure including spaced apart inner and outer walls defining a mould cavity therebetween, one of said walls being rigid and at least partly water-pervious and the other of said walls being elastically deformable and water-impervious, a rigid support structure backing up the entire surface of said elastically deformable wall which faces away from said rigid wall, means defining an opening into said cavity through one of said walls of the mould structure for the injection into said cavity of the easily flowable mixture, and a movable member displaceable into said opening in the direction toward said cavity following the injection of the mixture into the latter to initially close said opening and then compress the mixture in said cavity for expressing a substantial portion of the water therefrom while said deformable wall is positively positioned by said rigid support structure; and (B) means for applying fluid under pressure between said rigid support structure and said elastically deformable wall to uniformly urge the latter toward said rigid wall, thereby completing the expressing of water from the mixture and the compression of the latter in the mould cavity.

4. Apparatus as in claim 3;

wherein said opening into the mould cavity is substantially annular and defined at an end of a cylindrical extension of said mould structure, and said movable member is in the form of a piston axially slidable in said cylindrical extension.

5. Apparatus as in claim 3;

wherein said rigid wall is the outer wall and said elastically deformable wall is the inner wall of said mould structure, and said means defining the opening includes a cylindrical extension of said rigid outer wall and a rigid core in said extension with a substantially annular clearance therebetween constituting said opening; and wherein said movable member is in the form of an annular piston slidable axially in said cylindrical extension from a first position, in which said piston is withdrawn from said annular clearance to permit the injection of the mixture through said annular piston and annular clearance, to a second position where said annular piston is disposed in said annular clearance, thereby closing the opening constituted by the latter.

6. Apparatus as in claim 5; wherein said elastically deformable inner wall is in the form of an inflatable core enveloping said rigid support structure, and said rigid support structure has passages opening at the surface thereof for applying said fluid under pressure to said inflatable core.

References Cited by the Examiner
UNITED STATES PATENTS

| | | | |
|---|---|---|---|
| 1,598,201 | 8/1926 | Koppitz | 264—86 |
| 1,846,279 | 2/1932 | Speirs. | |
| 2,079,393 | 5/1937 | Benge | 18—30 |
| 2,311,358 | 3/1943 | Baily | 264—86 |
| 2,878,727 | 3/1954 | Groot | 25—128.1 |
| 2,798,256 | 7/1957 | Eynard | 18—30 |
| 2,983,021 | 5/1961 | Maillard | 25—127 |

FOREIGN PATENTS

| | | |
|---|---|---|
| 530,837 | 8/1954 | Belgium. |
| 1,249,159 | 11/1960 | France. |

ROBERT F. WHITE, *Primary Examiner.*

MORRIS LIEBMAN, LESLIE H. GASTON, *Examiners.*